UNITED STATES PATENT OFFICE.

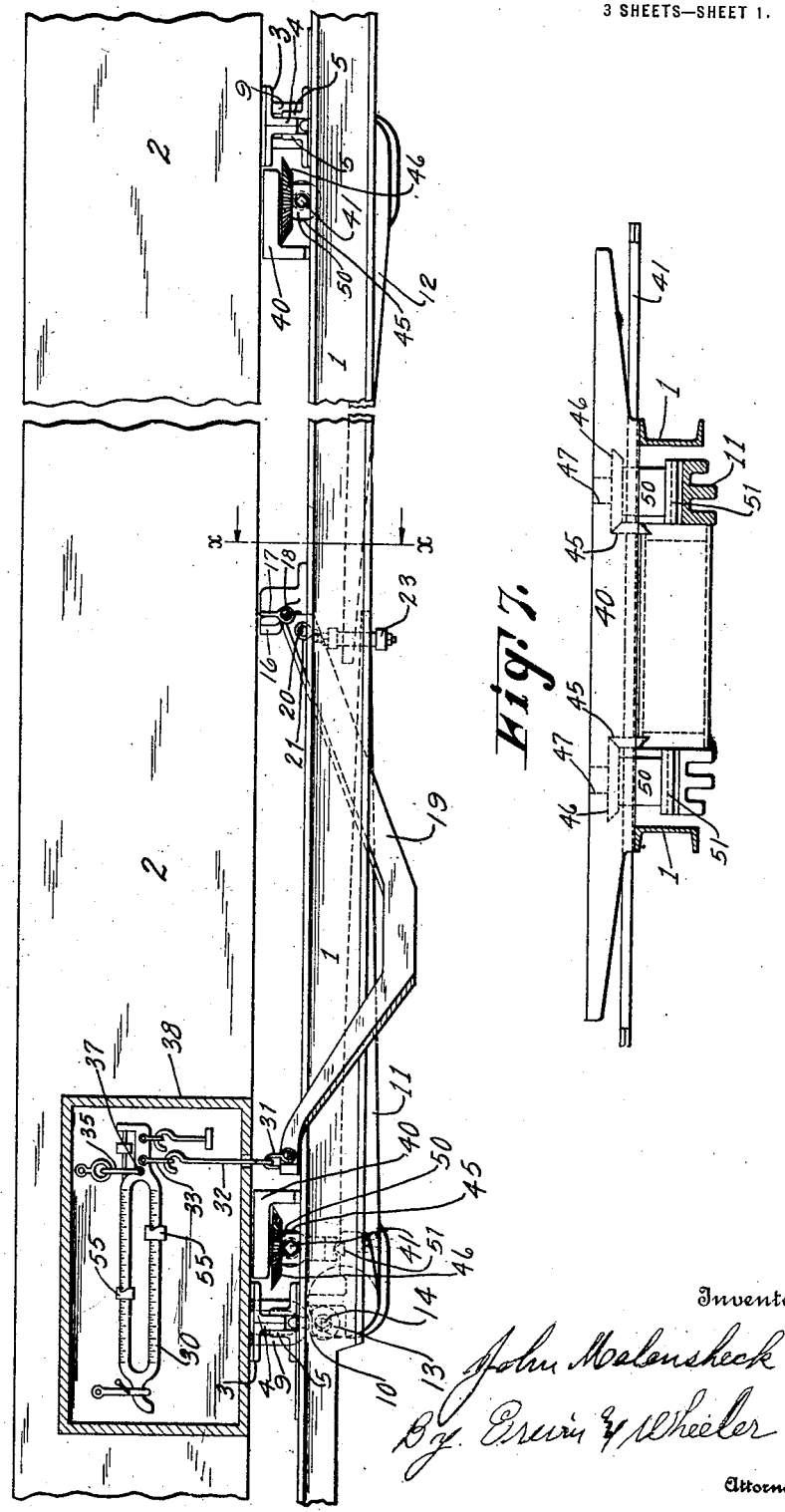

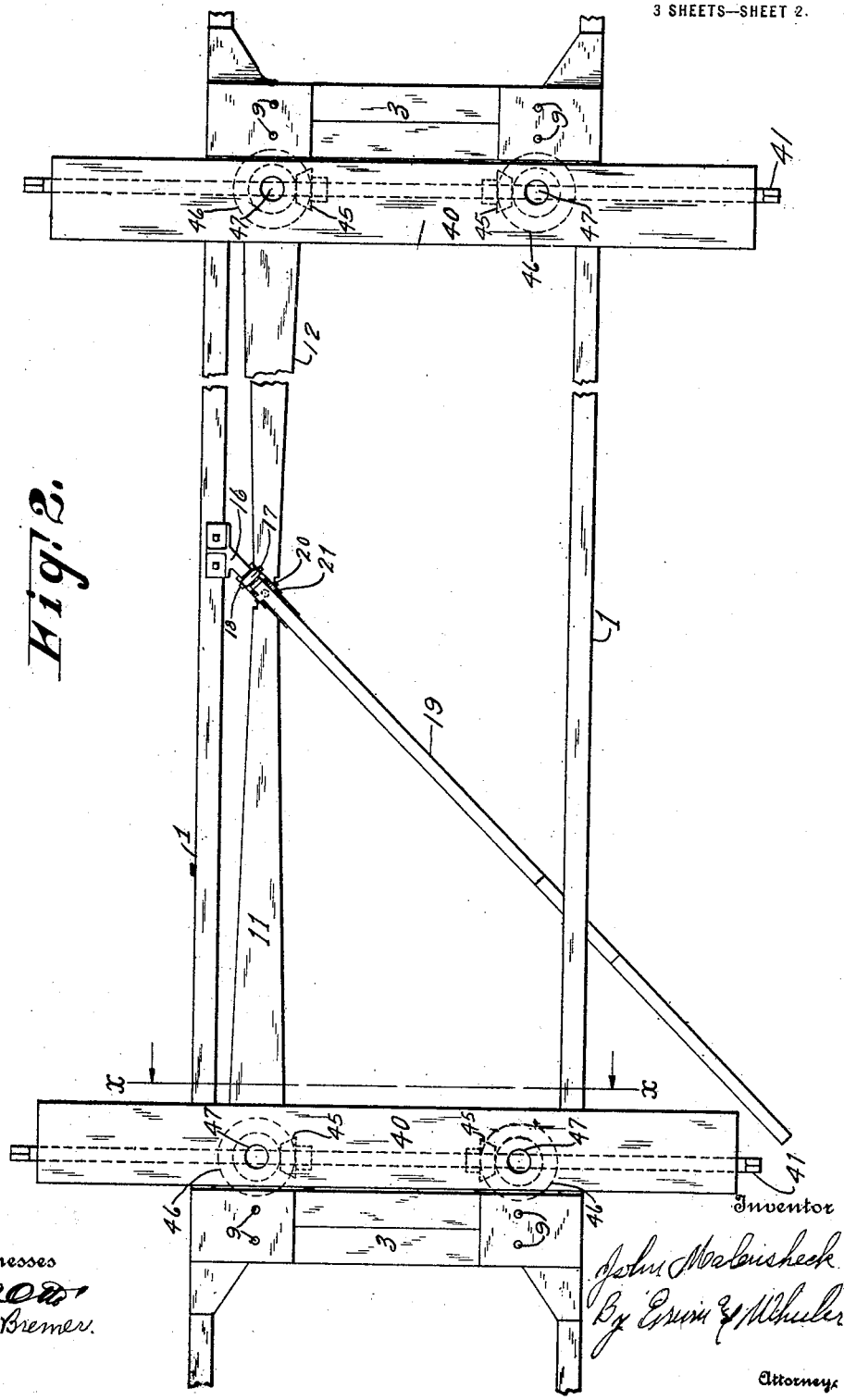

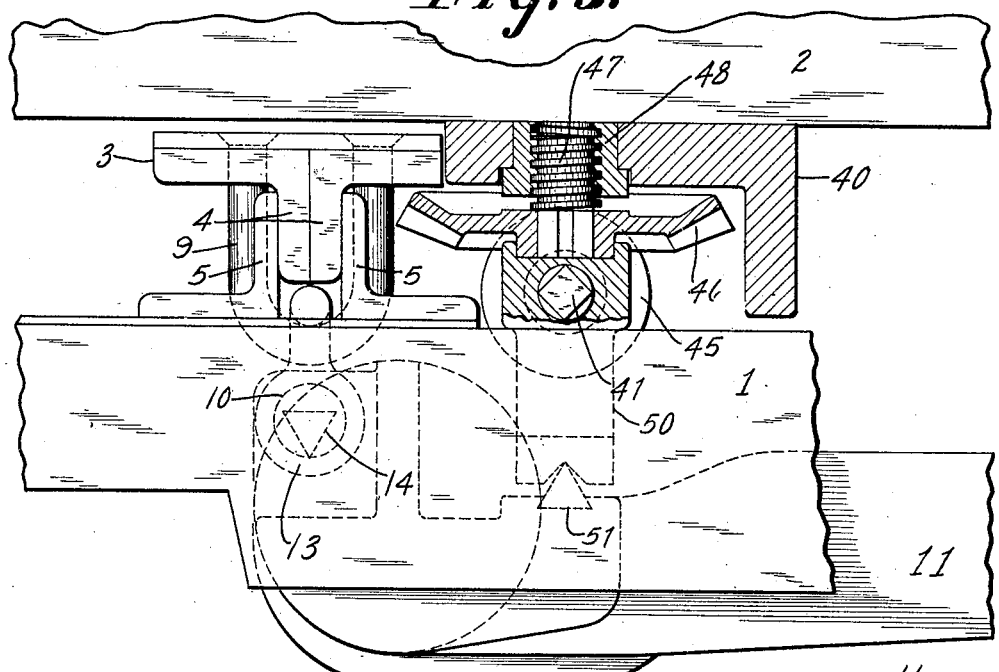
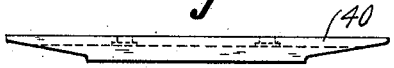
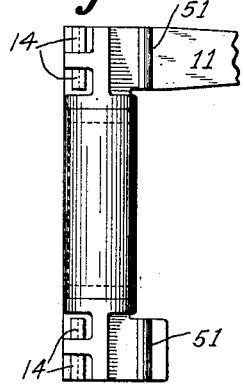
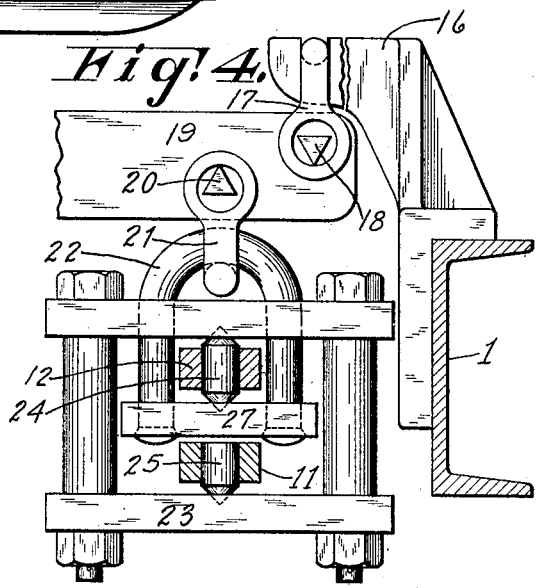

JOHN MALENSHECK, OF WEST ALLIS, WISCONSIN.

WEIGHING APPARATUS FOR PORTABLE VEHICLES.

1,322,710.　　　　Specification of Letters Patent.　　Patented Nov. 25, 1919.

Application filed March 29, 1915. Serial No. 17,592.

*To all whom it may concern:*

Be it known that I, JOHN MALENSHECK, a citizen of the United States, residing at West Allis, county of Milwaukee, and State of Wisconsin, have invented new and useful Improvements in Weighing Apparatus for Portable Vehicles, of which the following is a specification.

My invention relates to improvements in weighing apparatus for portable vehicles.

The object of my invention is to provide a form of apparatus in which the efficiency and accuracy of the device will not be impaired or destroyed under the conditions of road travel.

More specifically stated, the object of my invention is to provide a form of apparatus which may be installed upon wagons, cars or other vehicles and utilized for the weighing of contents of such vehicles without subjecting the apparatus to the weight of the vehicle or its contents while the vehicle is in motion, means being employed for subjecting the weighing apparatus to the weight of the load (*i. e.* the contents of the vehicle including the box or container therefor), when it is desired to determine the weight, the weighing apparatus being thereafter relieved of the load without being disconnected from the vehicle. By my improved apparatus, I am therefore able to determine the weight of the load at the origin or place of manufacture or shipment, and to again determine the weight of the load at place of delivery, or at various places of delivery, in case of partial deliveries at different stations. By relieving the weighing apparatus of the load while the vehicle is in motion, the effect of shocks and jolts upon the apparatus is minimized to a point where no serious impairment or injury will result to it.

In the drawings,—

Figure 1 is a side elevation of a portion of a vehicle frame and box with my invention applied thereto.

Fig. 2 is a plan view with the box removed.

Fig. 3 is a detail view showing fragments of the box and frame, with an intervening bolster and load shifting means, whereby the weight of the box may be shifted from the bolster to the weighing apparatus, parts of which are illustrated in section and in position for supporting the load from the weighing apparatus instead of the bolster.

Fig. 4 is a detail view showing one of the frame bars in cross section on line *x—x* of Fig. 1 and also showing the coupling connecting the main tilting beams of the weighing apparatus with the scale operating lever.

Fig. 5 is a plan view on a reduced scale of the auxiliary bolster.

Fig. 6 is an edge view of the same.

Fig. 7 is a sectional view drawn on line *x—x* of Fig. 2.

Fig. 8 is a plan, showing the pivoted end of a main lever.

Like parts are identified by the same reference characters throughout the several views.

The main frame 1 may be of any ordinary construction, and the box 2 is supported therefrom by a bolster 3 preferably composed of a set of angle iron members having depending flanges 4 suitably socketed between the upwardly projecting arms 5 or brackets connected with the main frame and which are also preferably composed of angle iron bars, the horizontal flanges of which are secured to the main frame 1 and the vertical flanges 5 are so disposed as to serve as guides for the flanges 4 of the bolster. Each of the bolsters 3 is provided with a set of U shaped hanger brackets 9, in which coupling links 10 are suspended. A set of main tilting beams or levers 11 and 12 are pivotally supported at their outer ends from a pair of coupling members 10, each of said coupling members having eye bearings 13 adapted to receive V shaped or knife edge bearing projections carried by cross heads with one of which each main lever 11 (or 12) is connected. The supporting triangular shaped members or lugs 14 each have one apex extending downwardly into bearing contact with the eye 13 in which it is supported.

At their inner ends, the levers 11 and 12 overlap and are supported from the main frame (Fig. 4) through brackets 16, link eye coupling 17, bearing lugs 18 in rocker bearing engagement therewith, lever 19, bearing lugs 20, link eye coupling 21, bracket yoke 22, equalizing frame 23 and point bearing projections 24 and 25 respectively. The bearing projection 24 is tapered at both ends and loosely socketed in the upper frame bar of frame 23 and also in a cross bar 27 carried by the bracket yoke 22. The point bearing member 25 connected with lever 11 is loosely socketed in the lower frame bar of the frame 23. The yoke 22 extends loosely through holes in the upper bar of frame 23 and the pressure of the inner ends of levers 11 and 12 is exerted downwardly during a weighing operation, as hereinafter explained. Therefore, the downward pressure of the inner arm of lever 12 will be exerted through the frame 23 upon the upwardly projecting knife edge of bearing member 24, so that the combined pressure of the two levers will be exerted downwardly through bearing member 24 upon the cross bar 27 carried by yoke 22.

It will be observed that since the link 17 is supported from the main frame 1, the bearing lugs 18 may oscillate in the eyes of this link coupling 17. The lugs 18, therefore, serve as fulcrum bearings for the lever 19, the load being applied to said lever through the main levers 11 and 12, the intervening couplings and links and the bearing lugs 20. Any downward movement of the inner ends of the levers 11 and 12 may therefore be transmitted to the registering scale beam 30 through links 31, 32 and 33. Scale beam 30 is of ordinary construction, the same being pivotally supported by a hanger 35, and link 33 being connected with the short arm of the scale beam in close proximity to the fulcrum pivot pin 37 carried by hanger 35.

The registering scale beam 30 is located within an inclosing casing 38 mounted on the side of box 2. The lever 19 projects outwardly from beneath the box 2 and preferably diagonally to a point underneath one end of the casing 38, so that link connections between this end of lever 19 and the scale beam may extend vertically through an opening in the bottom of said casing.

Normally the box 2 or load carrying members of the vehicle will be supported from the main frame by the bolsters 3 and all parts of the weighing apparatus will be relieved from pressure other than that exerted by the weight of the parts themselves. But when it is desired to weigh the load, the load supporting box or member 2 is lifted from the bolsters 3 and supported from the main levers 11 and 12. To accomplish this, I provide a pair of auxiliary bolster bars 40, one near each end of the box 2. Cross shafts 41 are journaled in suitable bearing boxes in the bar supporting posts 50 and these shafts have squared ends whereby they may be rotated by means of any suitable detachable crank applied thereto. When rotated, their motion will be transmitted to the auxiliary bolster bars 40 through beveled pinions 45, beveled gear wheels 46 and screw shafts 47, on which the gear wheels 46 are mounted. These screw shafts are vertically disposed and constitute swiveled extensions of the posts 50.

They have threaded bearings in members 48 connected with the auxiliary bolster bars 40 and therefore, by actuating cross shafts 41 in one direction, the bolster bars 40 will be lifted to raise the box 2 above the main bolsters 3 as shown in Fig. 3. The lower ends of the posts 50 are suitably socketed to receive the triangular bearing lugs 51, carried by the main levers 11 and 12.

When the box 2, with the load, is thus supported from the main levers 11 and 12 by means of the auxiliary bolster bars 40, it is obvious that a downward pressure will be exerted on the inner ends of the main levers and that this downward pressure will be transmitted to the scale beam 30 and will have a tendency to lift the weight carrying arms of said scale beam. The weights 55 will be shifted on the scale beam to counterbalance the load in the usual manner and indicate the weight thereof by means of the index on the scale beam. After the weight has been ascertained, cross shafts 41 will be actuated in the reverse direction to lower the auxiliary bolster bars 40 until the box 2 is again supported upon the boister 3, whereupon the weighing apparatus will again be relieved from the load.

Owing to the fact that the various levers are fulcrumed to their respective supports by means of links and rocker bearing members, such as the triangular lugs above described which reduce the contact areas to a minimum, I am enabled to accurately weigh the load, notwithstanding the fact that the vehicle may occupy an inclined or tilted position upon an inclined or uneven roadway, unless the tilting of the vehicle is considerably in excess of that to which vehicles are subjected on ordinary roads. It will be understood, however, that in case the roadway is inclined to such an extent that the accuracy of the weighing apparatus might be impaired, the operator will move the vehicle to a point where the ground is substantially level before shifting the load upon the weighing apparatus.

In the foregoing description, the term "load" may be assumed to include the weight of the box 2 and its contents, the actual net weight being ascertained by deducting the weight of the box itself or by adjusting the scales so that they will balance with the weight of the empty box included. The term "a box" is used to designate any platform or container upon or in which the net load may be carried.

I claim—

1. In a vehicle, the combination with wheel supported frame and a main bolster, of an auxiliary bolster, manually adjustable means for shifting the load from one bolster to the other, guides for preventing shifting movements of the main bolster when relieved of the load, lever connections for supporting the auxiliary bolster, and weighing scales operatively connected with said lever connections.

2. Weighing apparatus for vehicles, including a set of load supporting members, jack screws for actuating said members into and out of load supporting position, and weighing scales operatively connected to receive and register the pressure of the load exerted upon said jack screws.

3. Weighing apparatus for vehicles, including the combination with a main frame and a set of main bolsters supported from said frame, of a set of auxiliary bolsters, a set of supporting posts, having swiveled jack screws at their upper ends in threaded engagement with the auxiliary bolsters, and a set of weighing levers, supporting said posts.

4. Weighing apparatus for vehicles, including the combination with a main frame and a set of main bolsters supported from said frame, of a set of auxiliary bolsters, a set of supporting posts, having swiveled jack screws at their upper ends in threaded engagement with the auxiliary bolsters, and a set of weighing levers supporting said posts, said weighing levers being fulcrumed upon the main frame.

5. Weighing apparatus for vehicles, including the combination with a main frame and a set of main bolsters supported from said frame, of a set of auxiliary bolsters, a set of supporting posts, having swiveled jack screws at their upper ends in threaded engagement with the auxiliary bolsters, and a set of weighing levers supporting said posts, together with a set of cross shafts in gear connection with the jack screws.

6. Weighing apparatus for vehicles, including the combination with a main frame and a set of main bolsters supported from said frame, of a set of auxiliary bolsters, a set of supporting posts, having swiveled jack screws at their upper ends in threaded engagement with the auxiliary bolsters, and a set of weighing levers supporting said posts, together with a set of cross shafts in gear connection with the jack screws, and means for engaging the cross shafts at the side of the vehicle to actuate the jack screws by rotation of said shafts.

7. Weighing apparatus for vehicles, including the combination with a main frame and a set of main bolsters supported from said frame, of a set of auxiliary bolsters, a set of supporting posts, having swiveled jack screws at their upper ends in threaded engagement with the auxiliary bolsters, and a set of weighing levers supporting said posts, said weighing levers having loose connection with each other, and a common connection with weight indicating mechanism.

8. The combination with the main frame of a vehicle, of a bolster thereon, a set of swinging links connected with the bolster, a lever having fulcrum bearing projections hung in said links, and means for shifting the load carried by the bolster from the bolster to said lever, said load shifting means including an auxiliary bolster, having its respective ends supported from the lever for vertical adjustment with reference to said main bolster, whereby said auxiliary bolster and its supporting lever mechanism may assume a horizontal position with the main frame and bolster in an inclined position.

9. The combination with the main frame of a vehicle, of a bolster thereon, a set of swinging links connected with the bolster, a lever having fulcrum bearing projections hung in said links, and means for shifting the load carried by the bolster from the bolster to said lever, said load shifting means including a set of vertically extensible members in knife bearing contact with the levers, and having upper end portions adapted to engage and lift the load from said main bolster, and support it from said links in a horizontal position regardless of the position of the main bolster.

10. Weighing apparatus for vehicles, including a pair of main levers having fulcrum connection with the vehicle near its respective ends, and having the inner ends of said levers in overlapping relation, a coupling frame inclosing the overlapping ends of said levers, a set of point bearing members loosely engaging and socketed in said coupling frame, and a link hanger provided with a member in which one of the point bearing members is loosely socketed and from which said coupling frame is supported, together with a motion transmitting lever in link connection with said hanger and a scale beam operatively connected with the motion transmitting lever and a main frame having a swinging fulcrum link supporting said last mentioned lever.

11. Weighing apparatus for vehicles, including a pair of main levers having fulcrum connection with the vehicle near its respective ends, and having the inner ends of said levers in overlapping relation, a coupling frame inclosing the overlapping ends of said levers, a set of point bearing members loosely engaging and socketed in said coupling frame, and a link hanger provided with a member in which one of the point bearing members is loosely socketed and from which said coupling frame is supported, together with a motion transmitting lever in link connection with said hanger, and a scale beam operatively connected with the motion transmitting lever and a main frame having a swinging fulcrum link supporting said last mentioned lever, said main levers being also fulcrumed to the vehicle by swinging link hangers.

12. Weighing apparatus for vehicles, including a pair of main levers having fulcrum connection with the vehicle near its respective ends, and having the inner ends of said levers in overlapping relation, a coupling frame inclosing the overlapping ends of said levers, a set of point bearing members loosely engaging and socketed in said coupling frame, and a link hanger provided with a member in which one of the point bearing members is loosely socketed and from which said coupling frame is supported, together with means for relieving said levers and couplings from the weight of the load when the vehicle is in motion.

13. Weighing apparatus for vehicles, including the combination with a main frame, of a set of lever connections fulcrumed to the main frame, counterbalancing means operatively connected with said lever connections, and manually controlled means for supporting the load either from the main frame or upon the said set of lever connections, said set including main levers and a common motion transmitting lever pivoted under the vehicle adjacent one side thereof and pivoted to said main levers adjacent said side, and extending obliquely across to the other side of the vehicle for connection with said scales.

14. Weighing apparatus for vehicles, including the combination with a main frame, of a set of lever connections each having a cross head loosely fulcrumed to the main frame, counterbalancing means operatively connected with said lever connections, and manually controlled means for supporting the load either directly from the main frame or indirectly upon the main levers of said set and in close proximity to the respective ends of the cross head at the will of the operator, said load receiving main levers being located near one side of the vehicle and arranged to transmit motion to the weighing scales through a common motion transmitting lever extending obliquely across to the other side of the vehicle, substantially as described.

15. Weighing apparatus for vehicles including the combination with a main frame, of levers pivotally carried by the main frame, counterbalancing means operatively connected with said levers, and extensible load sustaining members seated on said levers between the pivot and the counterbalancing means and adapted for extension to shift the load from the main frame to the levers.

In testimony whereof I affix my signature in the presence of two witnesses.

JOHN MALENSHECK.

Witnesses:
LEVERETT C. WHEELER,
IRMA D. BREMER.